Nov. 3, 1959

G. STAVIS 2,911,644

DOPPLER RADIO ANTENNA

Filed Nov. 30, 1956

INVENTOR.
GUS STAVIS

BY *H. L. Mackey*

ATTORNEY

Nov. 3, 1959 G. STAVIS 2,911,644
DOPPLER RADIO ANTENNA
Filed Nov. 30, 1956 3 Sheets-Sheet 2

INVENTOR.
GUS STAVIS
BY
ATTORNEY

Nov. 3, 1959      G. STAVIS      2,911,644
DOPPLER RADIO ANTENNA

Filed Nov. 30, 1956      3 Sheets-Sheet 3

INVENTOR.
GUS STAVIS
BY
ATTORNEY

२,911,644
Patented Nov. 3, 1959

2,911,644

DOPPLER RADIO ANTENNA

Gus Stavis, Ossining, N.Y., assignor to General Precision Laboratory Incorporated, a corporation of New York Application November 30, 1956, Serial No. 626,799

2 Claims. (Cl. 343—758)

This invention relates to pulsed Doppler microwave radio antennas and particularly to antennas which are unaffected in calibration by altitude changes.

Pulsed Doppler radios receive Doppler echo signals only between transmitting pulses, for during these transmitting pulses the receiver is disabled. At such ranges that the microwave radiation travel time equals an integral multiple of the pulse period, part of the echo signal is lost. This generally has an effect on the average Doppler frequency information contained in the echo signal, so that at and near these ranges an erroneous Doppler frequency is derived. This error has been found to be as much as 5% for some antenna designs, so that in an instrument otherwise capable of an accuracy of .05% this type of error can be serious. This error may be termed "range hole" error.

When the pulsed Doppler instrument is airborne the altitudes corresponding to those ranges at which part of the echo signal is lost and the signal information is erroneous are termed "altitude holes." A similar effect occurs over water due to the dependence of the strength of the echo upon the angle of incidence at the water. This water effect thus causes similar errors in the derived Doppler frequency.

When airborne pulsed Doppler apparatus is employed to measure aircraft ground speed the relation between Doppler frequency D and speed V is $$\frac{D}{V} = \frac{2}{\lambda} \cos \gamma \qquad (1)$$

in which $\lambda$ is microwavelength and $\gamma$ is the angle between the aircraft direction of motion and the microwave beam. The ratio $$\frac{D}{V} = k \qquad (2)$$

is termed the calibration ratio or calibration constant of the apparatus, and errors caused by altitude holes or selective sea return are frequently stated in terms of percent error in this calibration ratio or constant.

A common form of microwave antenna consists of a planar array or plurality of linear arrays of radiating elements. Such an antenna is commonly used in airborne apparatus and is carried on a platform oriented to the ground track plane or transversely thereto. The platform may be stabilized horizontally, or to the aircraft's velocity direction, or otherwise. Such an antenna may emit one or more beams of microwave radiation toward the earth, and in nearly every case at least one beam is displaced from the vertical both longitudinally along the ground track and laterally. One common form of such antenna emits four main beams in four directions intermediate the longitudinal and traverse axes.

Since the radio receiver utilizes the Doppler echo information, it is desirable that each radio transmitter beam irradiate a ground pattern which is elongated along a line of constant Doppler frequency which may be termed an "isodop." A linear array aligned as described normally irradiates the earth in one or more such patterns, as do many planar arrays employed for such purposes.

The antenna of this invention has for its function the production of a return signal which is substantially free of calibration error. It consists in one simple form of a four-beam planar microwave antenna. This planar array is divided into two planar arrays hinged together at one point, so that when the hinge is closed they behave as a single undivided planar array, but when the hinge is opened two of the beam patterns are rotated in one sense and the other two beam patterns are rotated in the opposite sense.

The general object of this invention is to provide a pulsed Doppler radio antenna which prevents the return signal from containing range hole calibration error.

More specifically, this invention provides an antenna which rotates or skews the target pattern of each beam in such manner as to minimize calibration error at beam travel times which are equal to multiples of the pulse repetition frequency.

A further understanding of this invention may be secured from the following detailed description and associated drawings, in which.

Figure 1:
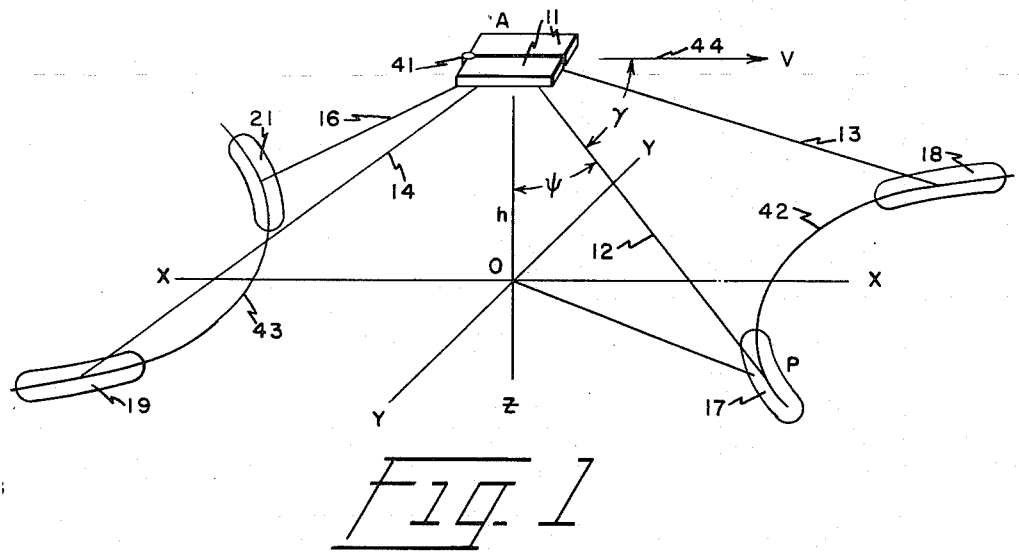
Figure 1 is a diagrammatic illustration of the irradiation of the earth by a four-beam microwave antenna.

Referring now to Fig. 1, a simple four-beam microwave antenna is indicated by the horizontal sheet 11 which is airborne and moving in the horizontal direction V. The four beams 12, 13, 14 and 16 are directed downward from this antenna as to make four irradiated spots 17, 18, 19 and 21 on the x—y earth plane. The two spots 17 and 18 are in the forward direction, one to the right and one to the left of the aircraft's ground track represented by the line x—x. The two spots 19 and 21 are similar but are directed aft, one to the right and one to the left of the line x—x.

Figure 2:
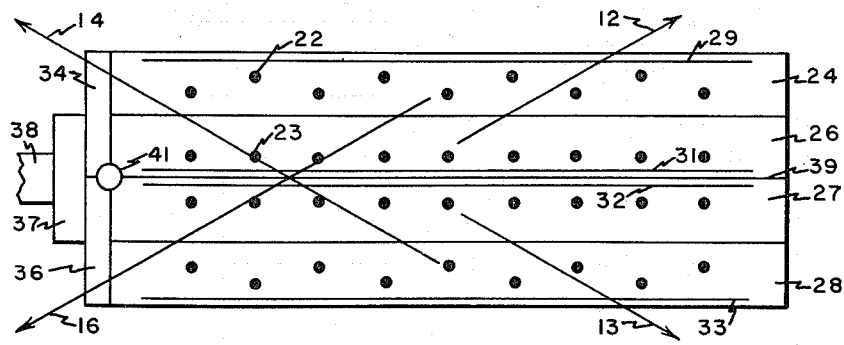
Figure 2 is a bottom view of one form of microwave antenna suitable for use with this invention.

A simple antenna construction for radiating four such beams is that of Fig. 2, which is a bottom view of a planar microwave array comprising four linear arrays. Each linear array comprises a row of microwave radiators represented by dots such as dots 22 and 23. These rows of radiators are mounted on four rectangular waveguides 24, 26, 27 and 28 arranged side by side in a plane. In each of the linear arrays 26 and 27 the radiators are all on one side of the waveguide center line and constitute an inphase array, while each of the arrays 24 and 28 has reversed coupling phase radiators constituting an antiphase array. Each array is provided with a side reflector, 29, 31, 32 and 33. All four arrays are fed with microwave energy from the same end through feed waveguides 34, 36, 37 and 38. With this arrangement each linear array emits a single cone of microwave radiation which is converted by its reflector into a partial cone. This partial cone in each case is positioned with its axis in the line of the longitudinal axis of the linear array.

The planar array of Fig. 2 is separated into two halves along the longitudinal center line 39, each half containing two linear arrays. These two halves are hinged together at one corner of each, the location being indicated by the circle 41. The feed waveguides 34, 36, 37 and 38 are suitably flexible to permit swinging the two halves apart about the hinge 41. This planar array emits microwave beams in the directions projected to the planar array plane indicated by the arrows 12, 13, 14 and 16.

Such a planar array if positioned as array 11, Fig. 1, would emit the like-numbered beams 12, 13, 14 and 16. The four partial cones of radiation represented by the four beams would make patterns on the earth's plane, generally indicated by spots 17, 18, 19 and 21, and the central line of each of these patterns would be a section of an hyperbola. The hyperbolic line 42 passes through the centers of patterns 17 and 18 and hyperbolic line 43 passes through the centers of patterns 19 and 21.

When the longitudinal axis of the linear array is coincident with the direction 44 of the velocity V of the aircraft, then the half cone angle $\gamma$ is the same as $\gamma$ in Equation 1. It is evident from this equation that Doppler return frequencies and the calibration ratio are constant for signals returned from all parts of the hyperbola 42 or 43. Such an hyperbola may then be termed for convenience an isodop. Conversely, since the patterns 17, 18, 19 and 21 have breadth normal to the isodop passing through the center of area, the Doppler return spectrum of each contains a band of Doppler frequencies.

The radio receiver contains a component termed a frequency tracker which finds the mean frequency of such a spectrum and emits a signal representing that mean frequency. So long as the complete beam pattern is received and so long as the received intensities are regularly related to the received frequencies, then the mean frequency signal emitted by the frequency tracker accurately represents the center of area frequency of the ground pattern.

However, in altitude holes the complete pattern is not received, and over water the amplitude frequency relation is distorted, so that in both cases an error is introduced into the frequency tracker output signal. This is the error $k_e$ which has been termed the calibration ratio error.

The magnitude of this error introduced into the frequency tracker output signal depends on the length of the beam path. This path is, for example, the length of the line 12 in Fig. 1. In the triangle AOP this is the line AP, the line AO is the aircraft's altitude $h$, and line OP may be termed the radius. It is obvious that in this triangle, at constant altitude, the beam length AP is proportional to the secant of the angle $\psi$ to the vertical, or $$AP = h \sec \psi \quad (3)$$

The relation between the slant range AP and the pulse repetition period R at the center of each altitude hole is:

$$AP = \frac{1}{2} C n R \quad (4)$$

in which C is the speed of light and $n$ is any integer.

Figure 3:
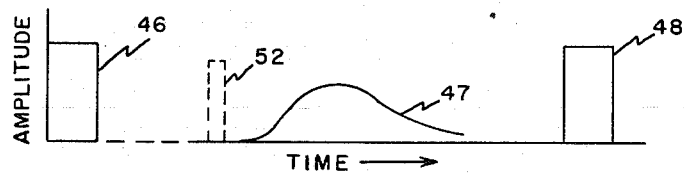
Figure 3 is a time-amplitude curve of transmitted and received pulses at the radio receiver.

The beam return or echo signal is not only spread out in frequency, but is also spread out in time so that if the transmitting pulse and receiver disabling gate be indicated as the rectangle 46, Fig. 3, the received signal might be so spread out in time as not to have a rectangular shape but a shape such as that of the curve 47. The next transmitting and receiver disabling gate pulse is indicated by rectangle 48 at a time later than the reception of the echo signal 47. This graph indicates that the aircraft is between the zero and first altitude hole. If now the aircraft ascends, the received pulse 47 will be received later, and the gate 48 will gradually encroach on the right end of the form 47, blotting out some of the received signal.

Figure 4:
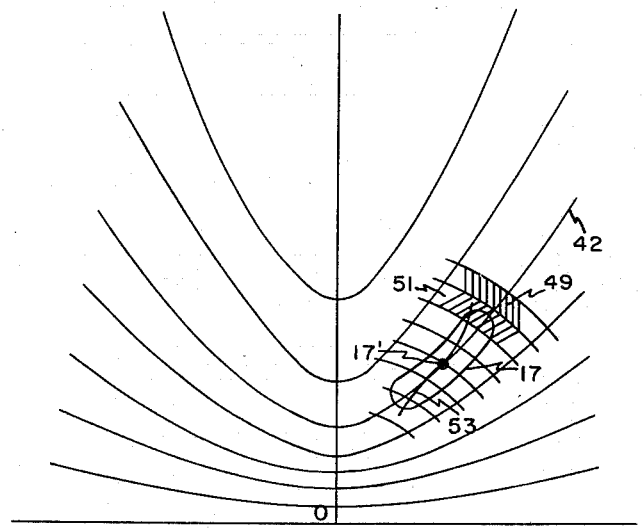
Figure 4 is a plan view of an irradiated ground pattern including psi and gamma coordinate lines.

The manner in which this affects the measured mean Doppler frequency may be visualized by reference to Fig. 4, in which the ground pattern 17, Fig. 1, of beam 12 is indicated in Fig. 4 in horizontal plan by the pattern 17. Circles centered at O have regularly increasing radii; the one through the center of area 17' would represent the radius OP, Fig. 1. The radii of those circles at constant altitude are proportional to tan $\psi$ and thus representative of $\psi$. The hyperbolas such as 42, Fig. 4, represent lines of equal Doppler frequency return, or isodops, and all lines from any isodop to the aircraft make equal $\gamma$ angles with the axis as described.

Figure 5:
Figure 5 is a curve depicting variation of calibration ratio error with altitude.

The situation depicted in Fig. 3 is represented in Fig. 4 when the transmitting pulse 48, Fig. 3, is being transmitted toward a ground zone represented by the area 49, Fig. 4, a little after the time of reception of the echo from ground pattern 17. As the aircraft ascends, the echo is received later, which would be shown by moving the pattern 17 out along the isodop 42. The effect of this motion is as if the zone 49 had moved to zone 51 and encroached on the ground pattern. Since the circles and hyperbolas do not cross at right angles, when this part of the received signal is blotted out the remainder of the ground pattern signal has a different center of area which no longer lies on isodop 42, but below it in the figure. That is, the Doppler frequency measured by the frequency tracker is lower, and thus the calibration ratio is given a negative error. This analysis is followed, moving the zone along the ground pattern, with the result that an error curve can be constructed showing change of calibration ratio error as the aircraft ascends through the first order altitude hole. Such an error curve is shown in Fig. 5. Similar curves can be constructed showing the behavior at all higher order altitude holes.

Figure 6:
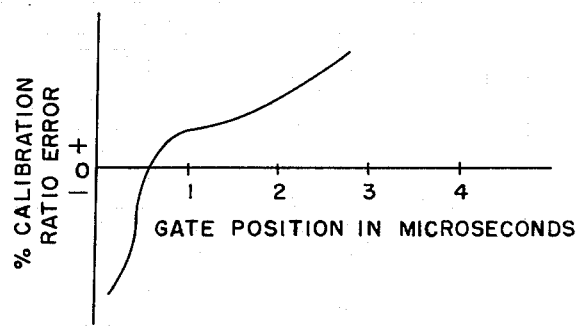
Figure 6 depicts the result of an analysis of the return signal from successive psi zones of the ground pattern.

It has been found useful to investigate this situation by means of an experiment which produced the inverse result. That is, in place of a blanking gate, a conductive gate of short duration was used. The airplane was flown at a constant altitude midway between two altitude holes. The receiver was gated on for a very short time interval at the pulse repetition rate, and this gate was timed to come between transmitting pulses but before the received pulse. Such a gate would be represented in Fig. 3 by the rectangle 52. This gate was then slowly retarded in time relative to the transmitting pulse and the received pulse, which would be represented in Fig. 3 by slow movement of gate 52 toward the right. As it encroached on the received signal form 47, signals began to be received by the receiver and indicated by the frequency tracker. At first these signals represented a Doppler frequency considerably lower than the center of area mean Doppler frequency. In or near the middle of the process they exactly equalled the mean frequency, and at the end they were higher. The data thus secured is shown in Fig. 6. The data of Fig. 6 when plotted in Fig. 4 has the form of a reverse curve 53 which indicates at each longitudinal psi zone of the pattern 17 the contribution of that narrow zone to the Doppler frequency spectrum. Reception indicated by all parts of the line 53 provides the complete Doppler spectrum, the effective center of which at the center 17' of area 17 is normally detected and indicated by the frequency tracker. Reception of only a part of the pattern provides a Doppler spectrum represented only by the fractional part of the line 53 included in that part of the pattern, and results in a different frequency tracker signal.

If by some means the pattern 17 together with its contained curve 53 could be rotated about its center 17 so that the curved line 53 would as nearly as possible lie along an isodop, it is obvious that removal of any portion of the pattern between any two psi circles would affect the mean frequency of the signal received from the remainder only very little or not at all. This invention has for its purpose such a rotation of the ground pattern and is effected by employing an antenna to be described.

Figure 7:
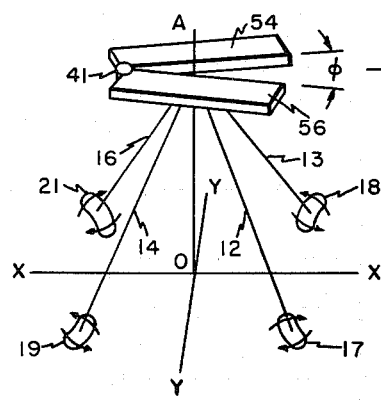
Figure 7 illustrates the effect of application of the antenna of this invention to an airborne microwave radio instrument emitting four beams.

The planar antenna of Fig. 2 is divided longitudinally into two halves. One half, 56, emits the beams 12 and 16 while the other half, 54, emits the beams 13 and 14. If now the two halves be separated by rotation about the hinge 41, the beams 12 and 16 will be rotated in one direction about hinge 41 while beams 13 and 14 will be rotated in the other direction. The effect in operation is indicated in Fig. 7. Assuming that the hinge 41 is in the vertical line to the ground, rotation of the half 54 rotates the patterns 18 and 19 counterclockwise about the foot O of the vertical line AO. This rotation comprises a rotation of each pattern 18 and 19, about its own center, as indicated by the arrows on the patterns, in the desired directions. Similarly, rotation of antenna half 56 by an equal and opposite angle rotates the patterns 17 and 21 clockwise about the center O, producing a rotation of each pattern about its own center of the same angular amount. There is also a translation of each pattern toward the $y$ axis, but the net effect is an alignment of the graph 53, Fig. 4, with an isodop.

In Fig. 7 the antenna split angle $\phi$ has been drawn much larger than necessary for the purpose of explicit illustration, and in Fig. 4 the divergence of the line 53 from an isodop has been exaggerated. In an actual case the error which is sought to be corrected may be only a fraction of one percent of the calibration ratio, and the amount of antenna opening necessary to effect optimum correction may be only of the order of one degree of angle. With other forms of antennas and other resulting forms of ground patterns the amount of possible altitude hole error may be far larger, requiring a correspondingly larger angular antenna opening for optimum correction.

The practice of this invention is not restricted to use of the antenna of Fig. 2 selected as an example, but is applicable to use of any antenna which may be so split or rotated as to rotate in a selected sense a single emitted beam, or an opposed pair of beams.

What is claimed is:

1. A microwave planar antenna array comprising, a first antenna section composed of a plurality of waveguide sections positioned in side by side relation each of which is provided with a series of longitudinally disposed radiating elements, the radiating elements of adjacent waveguide sections being so coupled to the respective sections on which they are positioned as to provide alternate inphase and antiphase arrays, a second antenna section composed of a plurality of waveguide sections positioned in side by side relation each of which is provided with a series of longitudinally disposed radiating elements, the radiating elements of adjacent waveguide sections being so coupled to the respective sections on which they are positioned as to provide alternate inphase and antiphase arrays, said antenna sections being positioned with their longitudinal axis lie in the same plane at an acute angle to each other.

2. A microwave planar antenna comprising, a first antenna section including at least one antiphase and at least one inphase linear array, a second antenna section including at least one antiphase and at least one inphase linear array, said first and second antenna sections being positioned in the same plane and having their longitudinal axes displaced at an acute angle as respects each other.

References Cited in the file of this patent

UNITED STATES PATENTS

| | | |
|---|---|---|
| 2,408,435 | Mason | Oct. 1, 1946 |
| 2,834,014 | Thorne | May 6, 1958 |